Dec. 12, 1961 C. W. LOGSDON 3,012,352
BITE-INDICATING DEVICE FOR ANGLERS
Filed July 5, 1960 2 Sheets-Sheet 1

INVENTOR
Clyde W. Logsdon,

BY

ATTORNEY

Dec. 12, 1961 C. W. LOGSDON 3,012,352
BITE-INDICATING DEVICE FOR ANGLERS
Filed July 5, 1960 2 Sheets-Sheet 2

INVENTOR
Clyde W. Logsdon,

BY

ATTORNEY

United States Patent Office 3,012,352
Patented Dec. 12, 1961

3,012,352
BITE-INDICATING DEVICE FOR ANGLERS
Clyde W. Logsdon, 400 E. Macon St., Carthage, Mo.
Filed July 5, 1960, Ser. No. 40,649
4 Claims. (Cl. 43—17)

This invention relates to signaling devices for anglers and has for its principal object the provision of a relatively simple and inexpensive mechanism of this character which will promptly visually indicate to the fisherman not only the fact that a fish has taken the hook but also the direction in which the bite was made or the fish is moving, which latter information frequently is of value in determining how best to handle the equipment in order to land the fish.

Two examples of a device constructed and arranged in accordance with the invention are illustrated in the accompanying drawings constituting a part of this specification, in which like reference characters designate like parts throughout the views, and in which:

FIGURE 1 is a side elevational view of one form of the device, showing it as mounted on the end portion of a conventional fishing rod, with the normal or neutral position of the indicating member when in use being shown in full lines and the alternative positions assumed by it in accordance with the different directions of movement of the fish at or subsequent to the time of biting being indicated by dotted lines and dot-and-dash lines, respectively;

Figure 1:
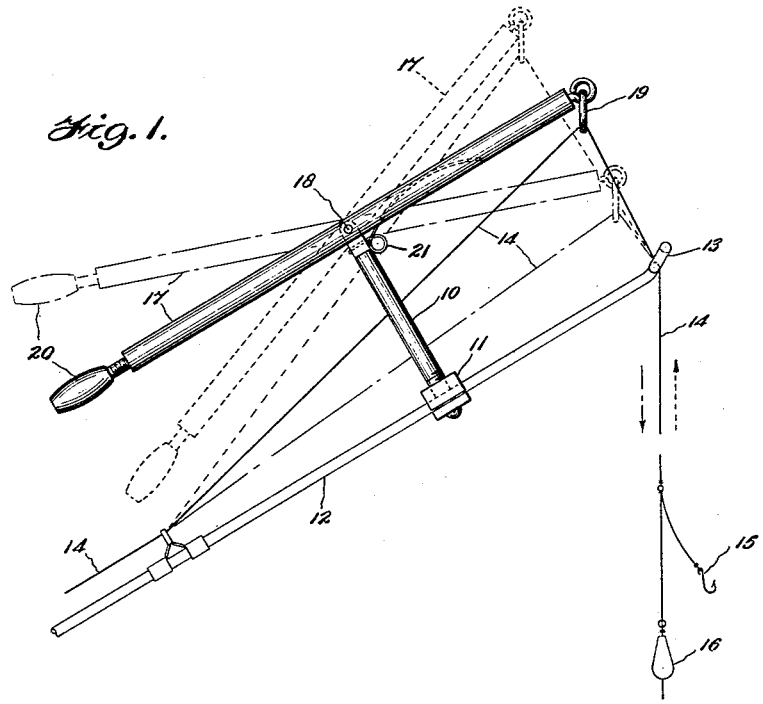
Figure 2:
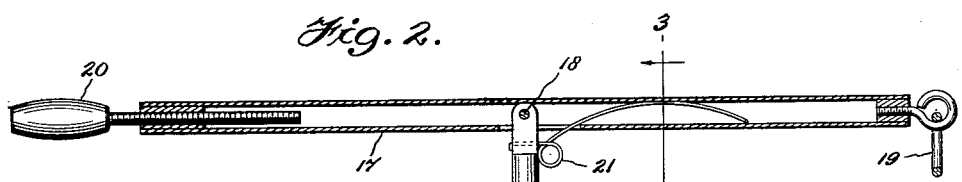
FIG. 2 is an enlarged longitudinal sectional view of the signaling device shown in FIG. 1.
Figure 3:
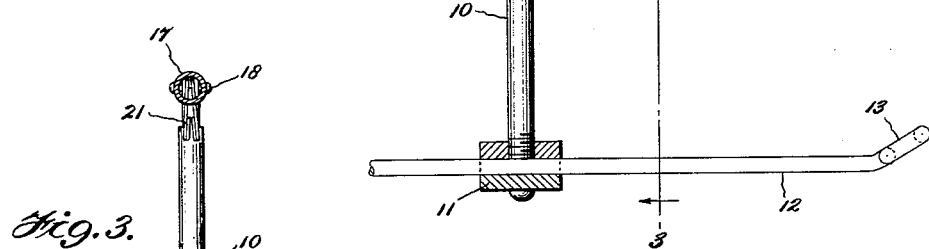
FIG. 3 is a transverse sectional-elevational view thereof on the plane indicated by the line 3—3 in FIG. 2, looking in the direction of the arrows.

Referring first to FIGS. 1, 2 and 3, as there shown the signaling device comprises a mounting member or staff 10 having at one end a clamp or other suitable means 11 whereby the staff may be readily attached to a fishing tackle element, in this instance the outward end portion of a conventional fishing rod 12 which is provided with the usual eye 13 at its tip for guiding the fishing line 14, to which is attached one or more hooks 15 and weights or sinkers 16. The other end of the post or staff 10 pivotally mounts an elongated bite-indicating member 17, the pivot 18 being located at substantially the mid-point of said indicating member. The outward end of such member is provided with a ring or eye 19 through which the line 14 freely runs previous to passing through the rod eye 13, and the other end of said member 17 adjustably mounts a counterweight element 20, axial adjustment of which enables the member 17 to be balanced against the downward force exerted on its outward end by the weighted line passing through said eye 19.

The indicating member 17 is normally maintained in a neutral (full-line) position substantially parallel to the rod 12 by means of a spring 21 mounted on the staff 10 and engaged with said member. The parts are so constructed and arranged that in this neutral position the spring exerts no force on the indicating member in either direction, but when said member is displaced either way from such position the spring will act to restore it thereto when the displacing force is removed or counteracted.

With the parts disposed in the full-line positions shown in FIG. 1, if a fish engages the hook 15 while moving downwardly, or thereafter moves in such direction as to increase the tension normally imposed on the line 14 by the singer 16, the balance provided by the counterweight 20 against such sinker-imposed force is destroyed and the indicating member 17 will be swung to the broken-line position, against the action of the spring 21. On the other hand, should the fish be moving upwardly or in such direction as to reduce or relieve the sinker-imposed tension on the line 14, the balance of the member 17 likewise will be destroyed but in this instance the counterweight 20 will swing said member to its dotted-line position, against the action of the spring 21. Thus, by noting the position assumed by the member 17 the angler may be apprised of the direction in which the fish is moving, and be governed thereby in his ensuing manipulation of the rod and reel.

In either case, should the fish become disengaged from the hook before being landed, thereby restoring the normal sinker-imposed tension on the line 14, the spring 21 will return the indicating member 17 to its neutral position.

Figure 4:
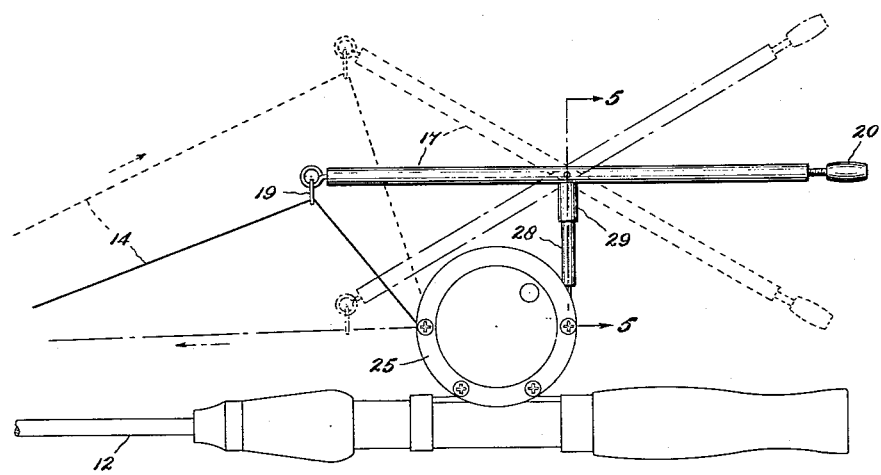
FIG. 4 is a side elevational view of another form of the invention, showing it mounted on a conventional fishing reel, and with the several operative positions thereof indicated as in FIG. 1.
Figure 5:
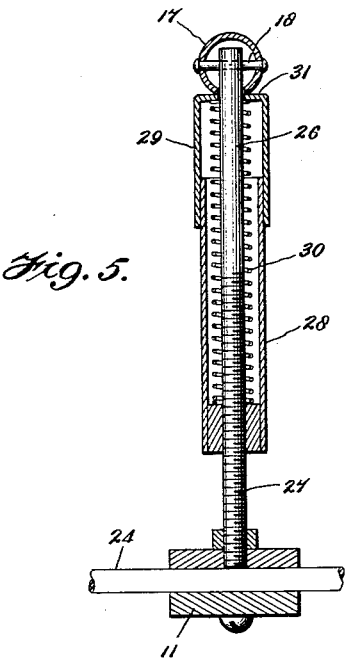
FIG. 5 is an enlarged vertical sectional view on approximately the plane indicated by the line 5—5 in FIG. 4, looking in the direction of the arrows.
Figure 6:
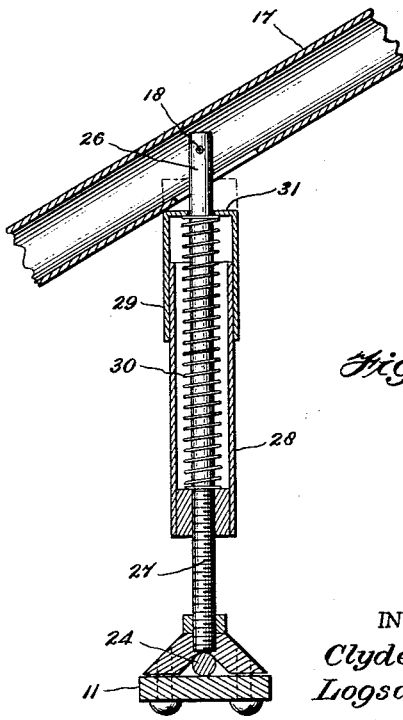
FIG. 6 is a view similar to FIG. 5 but at right angles thereto, and showing the signaling member in one of its bite-indicating positions.

In FIGS. 4, 5 and 6 the form of the device there shown is illustrated as mounted on a cross member 24 of a reel 25, although it is obvious that either form may be mounted on either the rod or the reel, as desired. The principal difference between the two forms resides in the mounting of the spring which maintains the indicating member in, or restores it to, neutral position.

As will be readily understood from these figures, the lower portion of the staff or post 26 is threaded for a substantial distance as indicated at 27, and this threaded portion has a tubular casing 28 adjustably mounted upon it. A cap member 29 slidably surmounts said casing 28, and the two house a coil spring 30 which freely surrounds the post 26 and yieldably maintains the top wall 31 of said cap in engagement with the indicating member 17. The general operation of this form of the invention is substantially the same as that of the first described form, since obviously when the member 17 is displaced in either direction from its neutral position as a result of conditions destroying its balance, it will depress the slidable cap 29, as depicted in FIG. 6, and thereby compress the spring 30, while when said conditions return to normal the spring will restore the indicating member to its neutral position. Adjustment of the casing member 28 on the post 26 may be employed to normalize the spring action to such position.

What is claimed is:
1. A bite-indicating device for use with fishing tackle that comprises a weight-equipped fishing line and a guiding support therefor, said device comprising a mounting member having means for the attachment thereof to said support; an indicating member oscillatably carried by said mounting member and having line-guiding means offset from its axis of oscillation whereby the weighted line will impose a turning force on the indicating member about said axis, said indicating member also having adjustable means arranged to counterbalance said turning force when the line-carried weights are submerged; and resilient means acting on the indicating member to normally maintain it in a determined neutral position, said resilient means accommodating displacement of such member from said position in one direction or the other upon fish-induced increase or decrease of the normal weight-induced tension on the fishing line, and automatically returning the indicating member to its said neutral position should said line tension return to normal.

2. A bite-indicating device for use with fishing tackle that comprises a weight-equipped fishing line and a guiding support therefor, said device comprising a staff provided with means for the attachment thereof to said support; an elongated indicating member pivotally connected intermediate its ends to said staff, and having a line-guiding eye at one of its ends arranged to cause the weighted line to exert a turning force on the indicating member about its pivot; a weight element adjustably carried by the other end portion of the indicating member whereby to counterbalance said turning force when the line-carried weights are submerged; and spring means mounted by the staff and engaging the indicating member to normally maintain the latter in a determined neutral position but accommodating its arcuate displacement therefrom in one direction or the other in response to fish-induced increase or decrease of the normal weight-induced tension on the fishing line, said spring means automatically restoring the indicating member to its said neutral position should said line tension return to normal.

3. An indicating device according to claim 2, wherein the spring means surround the staff, and are enclosed by a tubular housing.

4. An indicating device according to claim 3, wherein a portion of the spring housing is adjustably mounted on the staff whereby to control the force exerted by the spring.

References Cited in the file of this patent
UNITED STATES PATENTS

| | | |
|---|---|---|
| 2,628,443 | Weckerling | Feb. 17, 1953 |
| 2,714,270 | Premo | Aug. 2, 1955 |